United States Patent [19]

Kennedy

[11] 4,258,394
[45] Mar. 24, 1981

[54] DIGITAL CIRCUIT FOR ACCURATELY DETECTING CHANGES IN THE GRAY SCALE OF A SCANNED IMAGE

[75] Inventor: Paul G. Kennedy, Monroeville, Pa.

[73] Assignee: Westinghouse Electric Corp., Pittsburgh, Pa.

[21] Appl. No.: 828,057

[22] Filed: Aug. 26, 1977

[51] Int. Cl.³ .............................................. H04M 1/40
[52] U.S. Cl. .................................... 358/284; 364/515; 358/94; 358/166
[58] Field of Search ................. 358/284, 96, 141, 166; 364/515

[56] References Cited

U.S. PATENT DOCUMENTS

| | | | |
|---|---|---|---|
| 3,249,690 | 5/1966 | Schubert | 358/284 |
| 3,911,212 | 10/1978 | Yoshizawa et al. | 340/146.3 AG |
| 4,101,961 | 7/1978 | Reiber | 358/96 |
| 4,143,401 | 3/1979 | Coviello | 364/515 |

FOREIGN PATENT DOCUMENTS 1277014  6/1972  United Kingdom ...................... 358/96

Primary Examiner—Robert L. Griffin
Assistant Examiner—Edward L. Coles
Attorney, Agent, or Firm—J. B. Hinson

[57] ABSTRACT

A digital circuit for detecting changes in the gray scale of scanned images is disclosed. Each line of video information produced by scanning the image is digitized. Each digital sample is compared to digital samples delayed a predetermined amount to generate a difference signal which is indicative of a change in the gray scale having a component perpendicular to the direction of scan. The digitized samples of the video signal are also stored in a memory having a capacity sufficient to store data representing a plurality of scan lines with a typical memory having a capacity for storing digital information representing eight scan lines. Selected digital samples from the stored data are compared to samples of the line being scanned to detect changes in the gray scale having a component parallel to the direction of scan. These changes in the gray scale are combined to generate a signal indicative of the central portion of the change in the gray scale of the image being scanned to drive a printer to generate a line drawing with the position of the lines corresponding to the central portion of the changes in gray scale of the scanned image.

8 Claims, 8 Drawing Figures

DIGITAL CIRCUIT FOR ACCURATELY DETECTING CHANGES IN THE GRAY SCALE OF A SCANNED IMAGE

BACKGROUND OF THE INVENTION

1. Field of the Invention

The invention relates to scanners and more particularly to digital scanners for detecting changes in the gray scale of a scanned image to generate a line drawing with the position of the lines corresponding to the central portion of the changes in the gray scale of the scanned image.

2. Description of the Prior Art

Typical prior art systems for scanning an image to generate a line drawing with the position of the lines corresponding to the changes in the gray scale of a scanned image have relied on analog techniques. Changes in the gray scale were generally detected by taking either the first or second derivative of the video signal from the scanner used to scan the image, or some combination of these, to generate signals indicative of the changes in gray scale of the scanned image. A typical example of such a system is disclosed in Ser. No. 585,641 now U.S. Pat. No. 4,072,218 assigned to the same assignee as this application. These systems had limited capability of detecting changes in the gray scale which were parallel to the direction of scan. Additionally the line width of the line drawing generated by these systems tended to vary depending on the direction of the line with respect to the direction of scanning. The true edges of out-of-focus objects were usually displaced because of the gradual changes in the gray scale resulting from such edges.

SUMMARY OF THE INVENTION

The system disclosed by this application is all digital and is capable of detecting changes in the gray scale with the detection capability being substantially independent of the direction of the changes in gray scale with respect to the scanning. Circuitry is also included which permits the detection of the center of gradual changes in the gray scale of the image being scanned. (Slightly out-of-focus photographs of edges of objects are an example of such an image.) This results in a system which is capable of producing line drawings with the position of the lines comprising the drawing corresponding to the center of changes in the gray scale with the capability of detection of changes in the gray scale and controlling the width of the line being substantially independent of direction. This superior result is produced by detecting changes in the gray scale in a direction parallel to the scanning and at right angles thereto to generate two signals, one indicative of changes in the gray scale in a direction perpendicular to scan and a second signal indicative of changes in the gray scale parallel to the direction of scanning. These two signals are then combined to produce a line drawing on a printer with the lines having an adjustable width with the ability to detect changes in gray scale being substantially independent of direction. This improved result is accomplished by scanning the image to produce a video signal comprising a plurality of lines. The amplitude of this signal is indicative of the gray scale of the portion of the image being scanned. Each line of this signal is periodically sampled to produce digital numbers indicative of the amplitude of this signal at the sample time.

Changes in the gray scale of the scanned image in a direction perpendicular to scanning is accomplished by comparing each digitized value of the video signal to a previous value from the same line. When the amplitude of this difference exceeds a predetermined amount a pulse is generated. A predetermined number of these pulses are shifted into a shift register. The pattern of pulses stored in the shift register is examined to generate a signal indicative of the central portion of the change in the gray scale. ("Central portion" is used to indicate that the *exact* center of a change in gray scale is both difficult to define and detect.) This signal is used to generate another digital signal having an adjustable time duration which drives a printer to generate a line segment having a predetermined length and a direction perpendicular to the direction of scanning.

The digital numbers representing the instantaneous values of the video signal at the sampling time are also stored in a digital memory. Sufficient memory is provided to store digital numbers representing several lines, typically eight, of the video signal. Changes in the gray scale having a direction parallel to the direction of scan are detected by comparing the digital number representing each sample of the video signal to a corresponding digital number from a previous line. When the difference between these two signals exceeds a predetermined amount a one bit digital pulse signal is produced. A predetermined number of these pulses are shifted into a shift register. The pattern of pulses stored in this shift register is examined to generate a signal indicative of the central portion of the change in gray scale. ("Central portion" is used to indicate that the exact center of a change in gray scale is both difficult to define or detect.) This signal is used to generate another digital signal which also drives the same printer to produce a line segment on the printer having a predetermined width and a direction parallel to the direction of scan. The combination of the two line segments results in a line drawing being produced by the printer with the lines corresponding to changes in the gray scale of the scanned image.

The line drawing representing the changes in gray scale may be printed in either positive or negative format. That is, the changes in gray scale can be printed as black lines of predetermined width on a white background or they may be printed as white lines of a predetermined width on a black background.

DESCRIPTION OF THE DRAWINGS

FIG. 8 is a circuit diagram for combining the signals indicative of changes in the gray scale in both the direction perpendicular to the scan line and parallel thereto to generate a composite signal to drive the printer.

DETAILED DESCRIPTION

Figure 1:
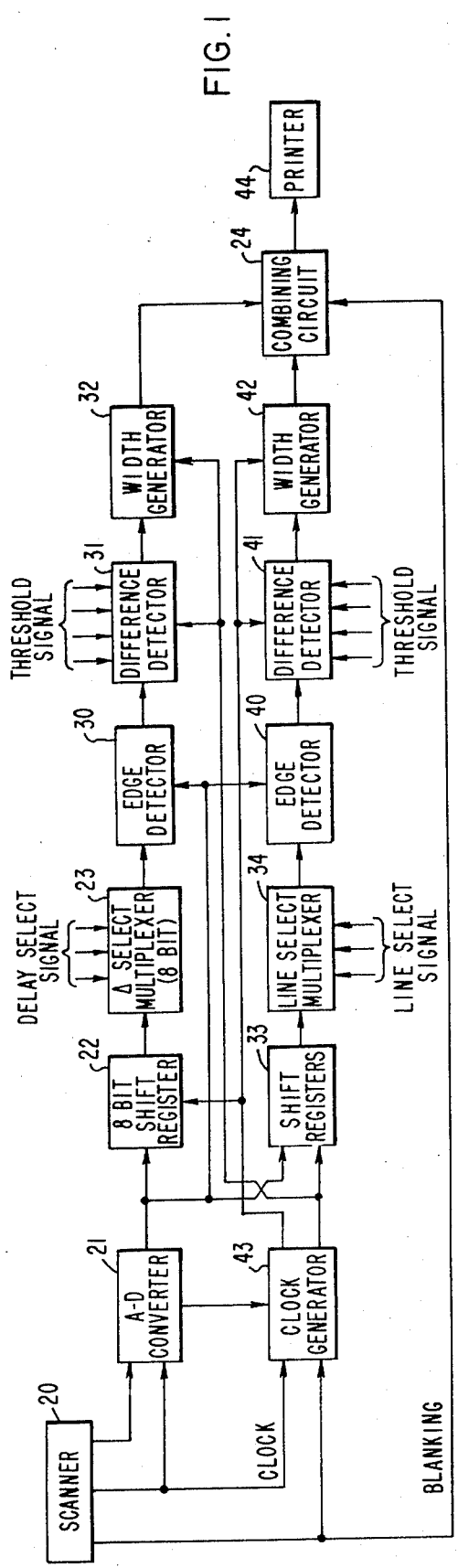
FIG. 1 is a functional block diagram of the preferred embodiment of the invention.

FIG. 1 is a block diagram of the preferred embodiment of the invention. The system includes a scanner 20 which scans an image, for example, a photograph. The scanner 20 may be any suitable type of scanner, for example, a TV camera or a laser-type scanner. In the preferred embodiment scanner 20 is a laser which scans the image to produce a line of video information each time the image is scanned.

Each line of video information from scanner 20 is coupled to an eight-bit analog-to-digital converter 21. A clock signal is also provided by scanner 20 to the analog-to-digital converter 21 permitting each line of video information generated by scanner 20 to be sampled to generate 4,096 digital numbers with each number representing the instantaneous amplitude of the video signal from the scanner 20.

The output data of the A to D converter 21 is stored in a shift register memory 22. In the preferred embodiment each sample of the video signal generates an eight-bit digital word at the output of analog-to-digital converter 21. Eight digital bits for each sample are available at the output of analog-to-digital converter 21 and are stored in a shift register-type memory 22. The shift register memory 22 has sufficient storage capacity to store digital numbers representing eight samples of the video signal from the scanner 20. Shift register memory 22 is arranged such that the data stored in each stage of the shift register is available as an input to a multiplexer 23. A digital delay select signal is also coupled to multiplexer 23 to select the output signals of the shift register 22 which are to be coupled to the output terminal of multiplexer 23 to generate a digitized and delayed version of the video signal appearing at the input of the analog-to-digital converter 21.

Changes in the gray scale of the image being scanned by scanner 20 are detected by an edge detector 30. Changes in the gray scale are detected by edge detector 30 by comparing the amplitude of the delayed digitized version of the video signal appearing at the output of multiplexer 23 to the output of the analog-to-digital converter 21 to generate a signal indicative of the absolute difference between these two signals. This absolute difference is compared to a threshold signal to generate a one bit digital signal indicating that the absolute difference is either above or below the threshold. A predetermined number of the bits of this signal are shifted into a shift register which is included in a difference detector 31. Digital information stored in this register is used to detect the center of gradual changes in the gray scale of the image being scanned. Out-of-focus edges in the scanned image is an example of a gradual change in gray scale. (The operation of this circuit will be described in detail later.) In some applications it may not be necessary to detect out-of-focus edges. However, if it is desired to make an accurate line drawing of an object from a photograph which includes out-of-focus edges, some technique must be used to detect the center of these edges.

In the preferred embodiment of the invention the shift register included in the difference detector 31 into which the bits of the digital signal indicating that the difference between the delayed version of the video signal and the video signal exceeds the threshold is shifted is eight bits long. This permits the eight bits stored in the shift register or these bits and the output signal of the edge detector 30 to be combined to determine the center of changes in the gray scale of the image being scanned. In either case, when all of the bits being considered form a symmetrical pattern, an output signal is generated. This output signal is coupled to a pulse width generator 32. The output of the pulse width generator 32 is a pulse indicating the width and position of the vertical line segment to be printed by the printer 44 corresponding to the detected change in the gray scale of the image being scanned.

The eight-bit output signal of the analog-to-digital converter 21 is also coupled to the input of a second series of shift registers 33. Included in the series of shift register 33 is a shift register for each bit of the output signal of analog-to-digital converter 21 with each of these registers being long enough to store digital data representing eight lines of the video signal from the scanner 20.

The registers 33 are arranged such that the stored data representing each line serves as an input to a line select multiplexer 34. A three-bit digital line select signal serves as a second input to line select multiplexer 34 to select the appropriate input signals to generate at the output of this multiplexer a digital signal spaced from the real time video signal by the selected number of lines. Edge detector 40 subtracts the delayed information from the multiplexer 34 from the real time information output at analog-to-digital converter 21 and takes the absolute value of this difference to generate an output signal which is coupled to difference detector 41. Difference detector 41 compares the output signal of edge detector 40 to a threshold signal and generates a one bit digital signal indicating when this signal exceeds the threshold. A predetermined number of the bits of this signal are shifted into a shift register. The pattern of pulses stored in this shift register is examined to generate a signal indicative of the center of the change in the gray scale of the image being scanned. The output signal from this circuit is coupled to a pulse width generator circuit 42. This circuit generates a signal which is coupled to the combining circuit 24 to generate a signal which causes the printer 44 to print a horizontal line segment having a predetermined width.

The sampling rate of the analog-to-digital converter 21 is controlled by a clock signal provided by the scanner 20. Additionally, the scanner 20 provides a blanking signal during the retrace time which is also coupled to the combining circuit 24 to disable this circuit during the retrace. Additionally, the analog-to-digital converter 21 generates a pulse indicating that each sample has been converted to its digital equivalent and that this digital equivalent is available at the output of analog-to-digital converter 21. These signals are coupled to a clock generator circuit 43 to generate control signals for controlling the memories and other circuits previously described.

Figure 2:
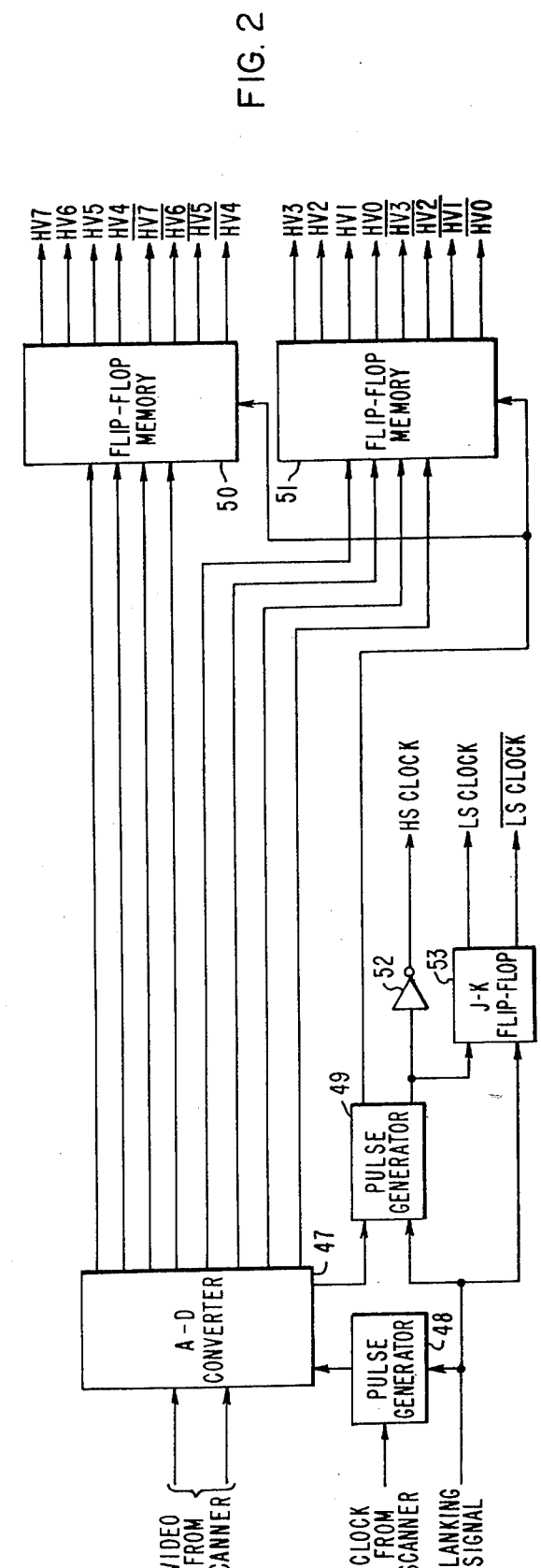
FIG. 2 is a block diagram of the digitizer used by the system.

FIG. 2 is a more detailed block diagram of the analog-to-digital converter and the clock generator. The video signal from the scanner 20 is coupled to the analog input of an analog-to-digital converter 47. The clock signal from the scanner 20 which specifies the sampling rate is coupled to the input of a 70 nanosecond pulse generator circuit 48. The blanking signal from the scanner 20 is coupled to the disabled input of this circuit to prohibit the generation of pulses during the blanking interval. This arrangement permits the clock signal specifying the sampling times from the scanner 20 to be free running and reduces the memory space required because the memory shift registers 22 and 33 (FIG. 1) are not shifted during the blanking interval.

The output signal of the 70-nanosecond pulse generator 48 is coupled to the sample input of the analog-to-digital converter 47. Each output pulse of the 70-nanosecond pulse generator 48 causes the analog-to-digital converter 47 to sample the video from the scanner 20 to generate an eight-bit output signal corresponding to the amplitude of the video signal from the scanner at the time of the sample. When sampling is complete the analog-to-digital converter 47 provides a trigger signal to a 500-nanosecond pulse generator 49. The blanking signal from the scanner 20 is also coupled to this pulse generator to disable the circuit during the blanking interval. Two complementary output signals are available from the 500-nanosecond pulse generator 49. One of these signals is coupled to the clock input of two flip-flop memories 50 and 51. This causes these flip-flops to be set to values corresponding to the output of the analog-to-digital converter 47. This results in generating a digital number at the outputs of these two memories corresponding to the output of the analog-to-digital converter 47. The output bits of these memories have been labeled HV0 through HV7, with HV0 being the most significant bit. These are the output signals from the A/D converter, illustrated functionally in FIG. 1. The inverted outputs are indicated by a "bar", in the conventional manner. These memories are synchronized with the clock signal generated by the 500-nanosecond pulse generator circuit 49.

The second output of the 500-nanosecond pulse generator circuit 49 is inverted by a buffer gate 52 to generate a high speed (HS) clock signal. A flip-flop 53 also receives the output signal of the 500-nanosecond pulse generator circuit 49 to divide this signal by two to generate a second low speed LS clock signal. The use of these signals will be described in more detail subsequently.

Figure 3:
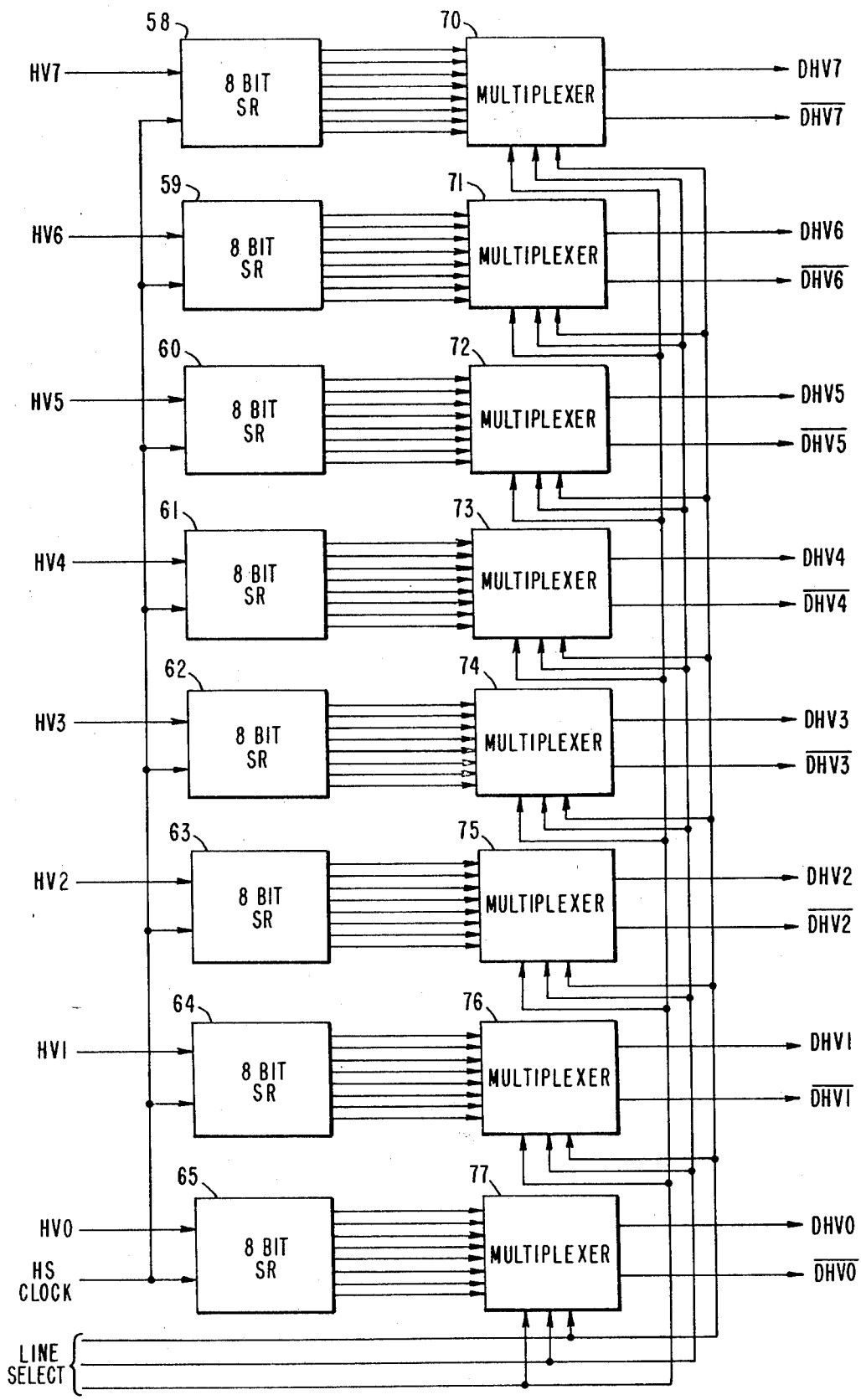
FIG. 3 is a block diagram of the memories used to delay the video samples to detect changes in the gray scale in a direction perpendicular to the direction of scan.

FIG. 3 is a more detailed diagram of the shift register memory 22 and the multiplexer 23 (FIG. 1). As previously explained, the shift register memory 22 (FIG. 1) is actually eight individual shift registers. These eight-bit shift registers are illustrated at reference numerals 58 through 65 (FIG. 3). Each register, 58 through 65, is capable of storing eight bits of digital information. The inputs to these eight registers are the bits of the digital numbers representing the amplitude of the video signal from the scanner 20. The digital numbers representing the video signals are provided to the input of these registers by coupling the data input terminal of each of the eight-bit shift registers, 58 through 65, to the appropriate output terminal of flip-flop memories 50 and 51 (FIG. 2). Input signals to these shift registers are labeled HV0 to HV7 to correspond to the signal designations used in FIG. 1. Data is shifted into these shift registers by coupling the clock signal terminal of each of the shift registers, 58 through 65, to the high speed clock signal derived from the output of an inverter 52 (FIG. 2). As previously explained, this clock signal includes a pulse which immediately follows the setting of flip-flop memories, 50 and 51. This causes an additional bit of digital data to be shifted into each of the shift registers, 58 through 65, for each cycle of the analog-to-digital converter 47 (FIG. 2). Since the shift registers, 58 through 65, are only eight bits long, only eight samples of the video signal from the scanner are stored in these shift registers.

Shift registers 58 through 65 are designed such that the data stored in each stage of these registers is available as an output signal. These output signals are coupled as inputs to eight multiplexers, 70 through 77. A three-bit digital line select number specifying the delay desired is coupled to the second input of each of the multiplexers, 70 through 77, to select which of the inputs are to be coupled to the output. This permits the generation at the output of these multiplexers, 70 through 77, a digital signal which is a delayed digital version of the video signal coupled to the analog-to-digital converter 77 (FIG. 2). The selected digital value and its complement are available at the outputs of multiplexers 70 through 77. The availability of both polarities of this signal simplifies the comparison of this signal to a selected threshold as will be subsequently described.

Figure 4:
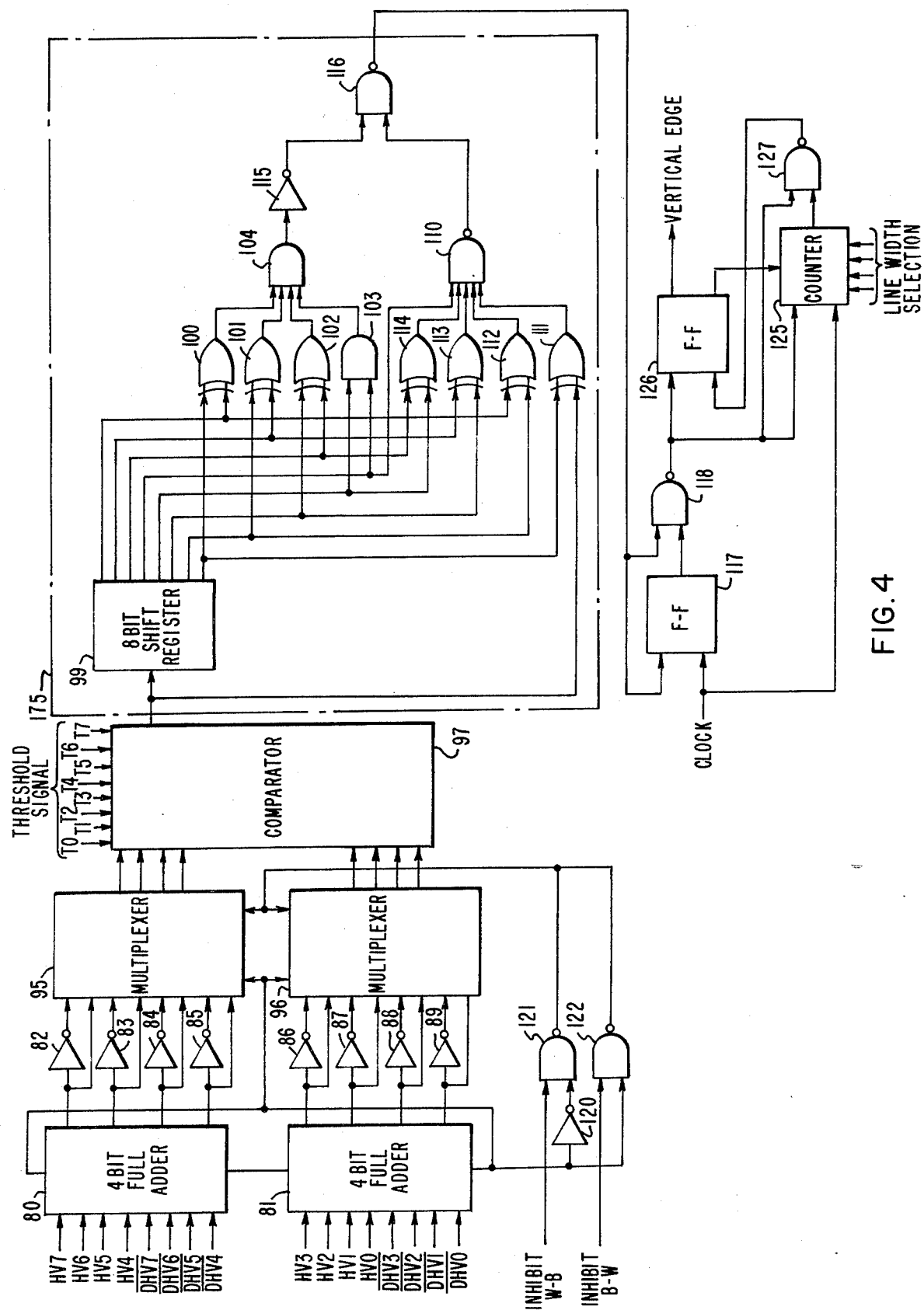
FIG. 4 is a diagram of the circuitry used to detect changes in the gray scale to generate line segments perpendicular to the direction of scan.

FIG. 4 is a more detailed diagram of the edge detector 30, difference detector 31 and pulse width generator 32 illustrated at reference numerals 30, 31 and 32 of FIG. 1. A digital number corresponding to the amplitude of the video signal at the last sampling interval is available at the output of flip-flop memory circuits 50 and 51 (FIG. 2). A digital number corresponding to the amplitude of the video signal at selected previous sampling interval and its complement are available at the output of eight multiplexers, 70 through 77 (FIG. 3). The output signals of flip-flop memories 50 and 51 and the complement of the selected delayed sample from the output of multiplexers 70 through 77 are coupled to the input of two four-bit adder circuits, 80 and 81, (FIG. 4). The output of these adders, 80 and 81, are inverted by eight inverter circuits, 82 through 89. The inverted output of the adders, 80 and 81, along with the output of the adders, 80 and 81, are combined in two multiplexer circuits 95 and 96 to generate an eight-bit digital number equal to the absolute value of the difference between digital numbers representing the current and delayed samples of the video signal. This absolute value of the difference between the two inputs is compared to a threshold by a comparator 97 to generate a signal indicative of the amplitude of the input signal relative to a predetermined threshold. When the absolute value of the output of the two adders, 80 and 81, exceeds the threshold, a one bit logic "one" signal is generated and shifted into an eight-bit shift register 99. If the change in contrast causing the logic one outputs from the magnitude comparator module 97 is not sharp the logic one output signal from this comparator 97 may be present for several clock pulses prohibiting the detection of the precise center of the gray scale change in the image being scanned by presence or absence of this signal.

A change in the gray scale is indicated by all of the bits stored in this register being logic "ones" or by the control bits having a logic "one" level surrounded by a symmetrical pattern of logic "zero" bits. Normally the threshold is selected such that the shift register 99 is not completely filled with logic "one" bits. Therefore, the central portion of the change in gray scale is indicated by the central bits being logic "one" surrounded by logic "zero" bits.

More specifically, the first and last bits of shift register 99 are coupled to be inputs of a first exclusive OR circuit 100. Similarly, the second and seventh bits, the third and sixth bits are coupled to the inputs of two additional exclusive OR circuits 101 and 102. The fourth and fifth bits of the eight-bit register are coupled to the inputs of an AND gate 103. Thus, so long as there is a symmetrical pattern of one bits stored in the eight-bit shift register 99, the output signals of exclusive OR's 100, 101 and 102 and AND gate 103 will all be logic ones. The output signal of all these gates are combined in a four input AND gate 104 to generate a signal indicating that a symmetrical pattern of one bits with at least the fourth and fifth bits being logic ones are stored in the eight-bit shift register 99. Additionally, if the input signal to the eight-bit shift register 99 is considered, it is possible to have a symmetrical pattern of bits stored in this register with only one logic "one" bit or an odd number of logic "one" bits. These patterns of bits are detected by coupling the fourth bit of the shift register 99 to one input of a NAND gate 110. The output of the comparator 97 and the eight bit of register 99 are coupled to the inputs of an exclusive OR gate 111. Similarly, the first and seventh, second and sixth, third and fifth bits form inputs to exclusive OR gates 112 through 114. The output signals of four exclusive OR gates, 111 through 114, also form inputs to NAND gate 110. The output signal of AND gate 104 is inverted by an inverter 115. Output signals from the inverter 115 and the NAND gate 110 are combined in a NAND gate 116 to produce a logic signal indicating that a symmetrical pattern of logic "one" and logic "zero" bits are stored in the eight-bit shift register 99. This corresponds to the center of a change in the gray scale of the image being scanned. The circuit described above consisting of a shift register 99, six exclusive OR gates 100, 101, 102, 111, 112, 113 and 114, two AND gates 103 and 104, two NOR gates 110 and 116, and an inverter 115 is a circuit which, as previously described, enables the detection of the center of a change in the gray scale of the image being scanned. This center detector circuit 175 is also utilized by another section of the system of this use will be described later.

The signal indicating the center of a change in gray scale of the image being scanned is coupled to the enable input of a triggerable flip-flop 117. This causes the output of this flip-flop to go to a logic "one" on the leading edge of the first clock pulse of the high speed clock signal following detection of the change in gray scale of the image being scanned. The complementary output of this flip-flop 117 forms a first input to a NAND gate 118. The second input to this gate is the output of NAND gate 116 which indicates detection of a change in gray scale. Combining these two signals in NAND gate 118 generates a logic one signal having a duration equal to the period of the high speed clock signal for each change in gray scale detected. This signal is coupled to the first input of a four-stage counter 125. This enables this counter to be preset to the value of an external digital line width selection signal which specifies the line width of vertical line segment to be produced by the printer 44. Additionally, this signal permits a line width flip-flop 126 to be set. Setting of the line width flip-flop 126 generates a logic one at the output of this flip-flop which will ultimately enable the printer 44 to print a line segment corresponding to the detected change in the gray scale of the image being scanned. The complementary output of this flip-flop is also coupled to an enable count input terminal of counter 125 enabling this counter to be incremented by the high speed clock signal. Once counting begins, counter 125 continues stepping until it reaches its maximum value. When this value is reached a gate 127 receives a signal indicating the maximum count has been reached. This signal turns on this gate and resets the vertical width flip-flop 126. Resetting of this flip-flop also disables the pulse width counter 125 to disable the printing of vertical lines by the printer 44 (FIG. 1).

In addition to the mode of operation described above, circuitry is included which permits the transitions in the gray scale from black to white or the transitions from white to black to be inhibited. The input to adders 80 and 81 are selected such that for transitions from white to black there will be an overflow signal from adder modules 80 and 81. This signal is inverted by an inverter 120 and combined with an inhibit white-to-black transitions signal in a NAND gate 121 to generate a signal which inhibits the multiplexers 95 and 96 when these transitions occur. Similarly, an inhibit black-to-white transitions signal is combined with the overflow signal from adders 80 and 81 by a NAND gate 122 to generate an inhibit signal for these transitions. This feature permits large areas of black or white in the image being scanned to be printed as narrow lines corresponding to the selected transitions.

Figure 5:
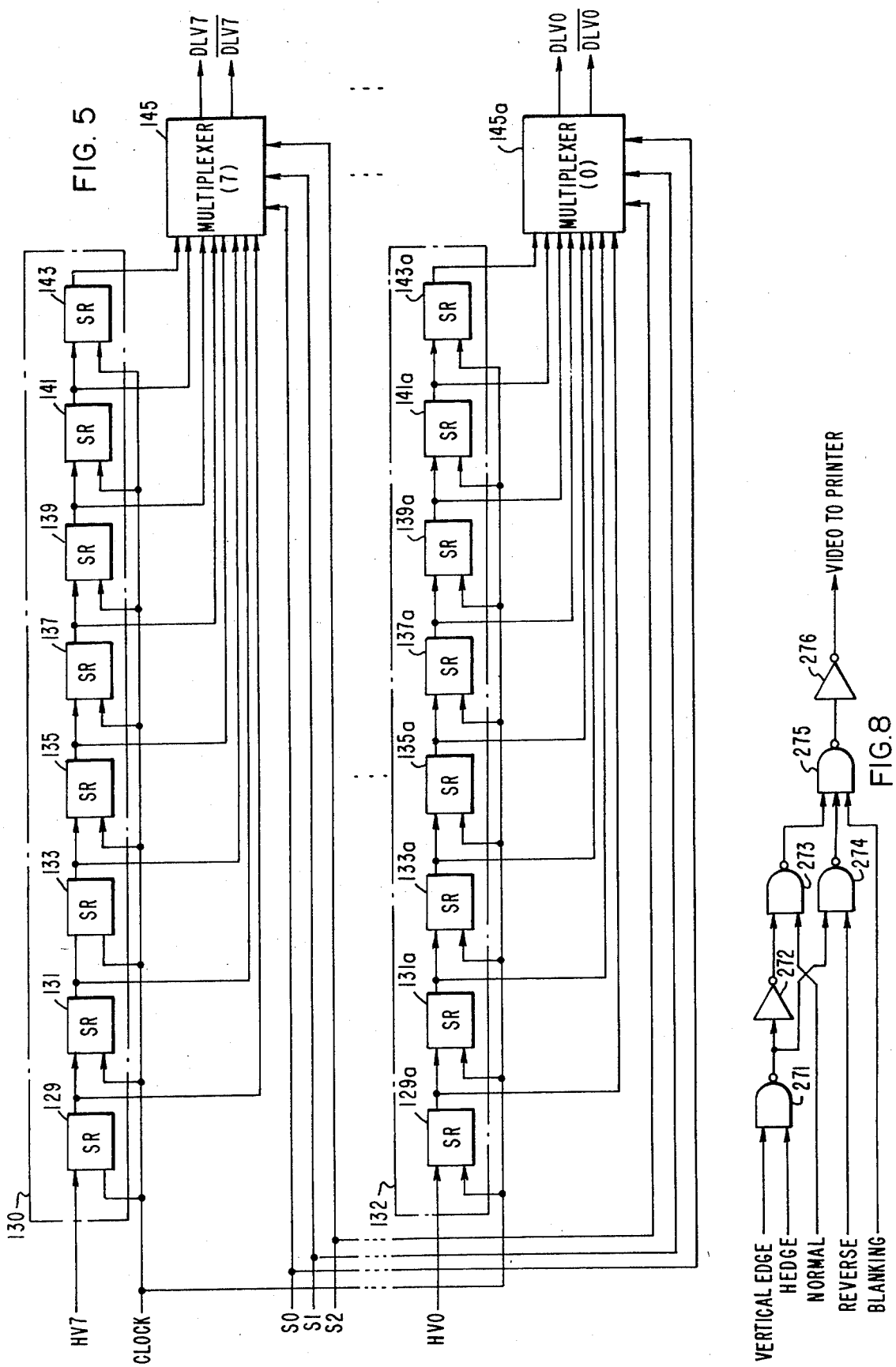
FIG. 5 is a block diagram of the memories used to delay samples of the video signal to detect changes in the gray scale parallel to the direction of scan.

The circuitry for detecting changes in the gray scale in a direction parallel to the direction of scan will now be described in detail. The output data from flip-flop memories 50 and 51 (FIG. 2) are also coupled to the input of eight shift registers. (Two typical registers are illustrated at reference numerals 130 and 132, FIG. 5.) Eight shift registers are used because each sample of the video signal from the scanner 20 results in eight bits of data at the output of flip-flop memories 50 and 51. Two of the identical shift registers 130 and 132 are illustrated in FIG. 5 with the most significant bit of each of the digital numbers resulting from sampling the video signal from the scanner 20 being stored in the first register 130 and the least significant bit of each of the digital numbers generated by sampling the video from the scanner 20 being stored in the second register 132. The other bits from each of the digital numbers are similarly stored identical shift registers. These registers are not illustrated for reasons of simplicity.

Each of the serial registers is actually comprised of eight serially connected shift register modules. The shift registers are clocked at one-half the sampling speed of the analog-to-digital converter 47. This reduces the amount of data stored in half and is possible because it was not felt that the resolution in the direction parallel to the scan line was as critical as the resolution in the direction perpendicular to the scan line. This permits fewer samples to be stored. Additionally, some applications may not require that the least signficant bits of each sample be considered. In such a case, the numbr of registers can be reduced.

The eight 2,048-bit modules comprising the first register are illustrated at reference numerals 129 through 143. As previously explained, the sampling rate of the analog-to-digital converter 47 (FIG. 2) is 4,096 samples per scan line and if only every other sample is stored in the shift registers illustrated in FIG. 5, each scan line will require the storage of 2,048 bits of information in each of the shift registers. For example, the most significant bit of each of the digital numbers appearing at the output of flip-flop memories 50 and 51 (FIG. 2) is coupled to the data input of shift register module 129 and this register is clocked at one-half the sample rate of the anolog-to-digital converter 47 by the low speed clock signal. Under these conditions, sufficient data will be shifted into this register module 129 to completely fill this module during each scan line. This process is repeated to completely replenish the data stored modules 129 through 143 every eight scan lines. The least significant bit of each sample of the video signal is similarly stored in a second register comprised of modules 129a through 143a. Identical numbers followed by the subscript "a" are used to identify the same modules of the two illustrated registers to further emphasize the identity of these two registers. The other six bits of each of the digital data words available at the outputs of flip-flop memories, 50 and 51, are stored in six other additional and identical shift registers, which are not shown as previously discussed for purposes of simplicity of illustration.

Each module of the registers illustrated in FIG. 5 store precisely one scan line of information. Since these registers are continually shifted at one-half the sample rate of the analog-to-digital converter 47, (FIG. 1) for any sample of data appearing at the output of flip-flop memories 50 and 51 the corresponding sample for the previous eight scan lines is available at the output of one of the modules comprising the shift register. For example, the output of module 129 is the corresponding sample from the previous line. Similarly, the output from module 143 is the sample corresponding to the current sample but displaced therefrom by eight scan lines.

The output of each of the modules, 131, 133, 135, 137, 139, 141 and 143 comprising the first shift register 130 are coupled as inputs to a multiplexer 145. A three-bit digital number is coupled to the input of this multiplexer to select the output of one of the register modules, 129 through 143, and its complement to be coupled to the output of the multiplexer 145. This enables data from any one of the eight previous scan lines to be selected and made available at the output of this multiplexer 145. Similarly, the outputs of various modules of the second register 132 are selected to generate at the output of a second multiplexer 145a samples of the data from a previous scan line as described above with reference to the first register 130.

Figure 6:
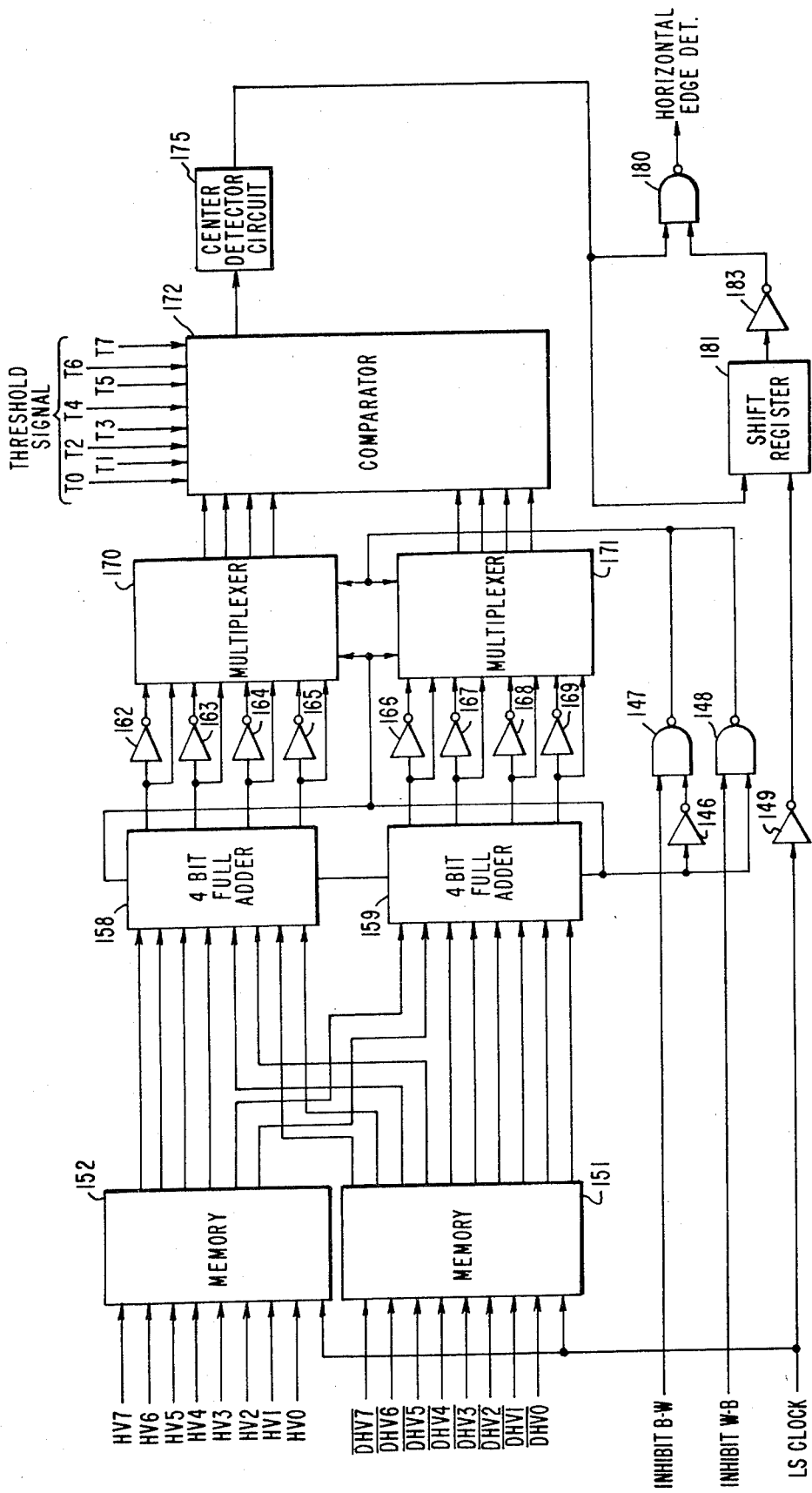
FIG. 6 is a diagram of the circuitry used to detect changes in the gray scale in the direction parallel to the scan.

The complement of the output signal from multiplexers 145 and 145a are coupled as input data to a memory 151 (FIG. 6). The digital number representing the current amplitude of the video signal is coupled as an input to a second memory 152. These memories are clocked by the same clock signal that shifts the registers 130 and 132, FIG. 5. Thus, for each clock pulse a new sample of data is available at the output of memory 151 and memory 152. The output signals of these memories, 151 and 152, are coupled as input signals of two four-bit adders, 158 and 159. The sum of the two digital numbers appearing at the output of adders 158 and 159 are inverted by eight inverters, 162 through 169. Two multiplexers 170 and 171 combine the output signals of the adder modules 158 and 159 and the output signals of the eight inverters 162 through 169 to produce the absolute value of the difference between the current samples and the selected previous sample. This signal is compared to a threshold signal in two four-bit comparator 172. Whenever the absolute value exceeds the threshold signal indicating that a significant change in the gray scale of the image being scanned is detected a one bit logic "one" signal is generated at the output of the four-bit comparator 172. This signal is shifted into a center detector circuit 175 to generate a signal corresponding to the central portion of the change in the gray scale of the image being scanned. (The details of this circuit were previous discussed with reference to FIG. 4.) The output signal of the center detector circuit 175 is coupled to one input of a two-input NAND gate 180 causing the output of this gate to go to a logic "zero" indicating that a significant change in the gray scale in a direction parallel to scanning has been detected. Circuitry is also included which inhibits detection of transitions from white to black or black to white from being detected. The overflow signal from adders 158 and 159 is inverted by an inverter 146. The inverted overflow signal is combined with the inhibit black-to-white signal in a NAND gate 147 to generate a gate 147 to generate a signal which inhibits the output of the multiplexers 170 and 171 for black-to-white transitions in the image being scanned. Similarly, the inhibit white-to-black transitions signal is combined with the overflow signal from adders 151 and 152 to generate a signal which inhibits the output of multiplexers 170 and 171 for white-to-black transitions of the image being scanned. This function is identical with the similar circuit described for the vertical detection circuit (FIG. 4).

The output signal of the center detector circuit 175 is also coupled as an input signal to a 2,048-bit shift register 181. The output signal of the shift register 181 is inverted by an inverter 183 and coupled to the second input of NAND gate 180. This causes the output signal of gate 180 to go low whenever a significant change in the gray scale is indicated by the output signal of the center detector circuit 175 and at a time exactly one scan line later. This assures that any detected change in the gray scale in a direction parallel to the scan line will be reduced in duration to two scan lines.

Figure 7:
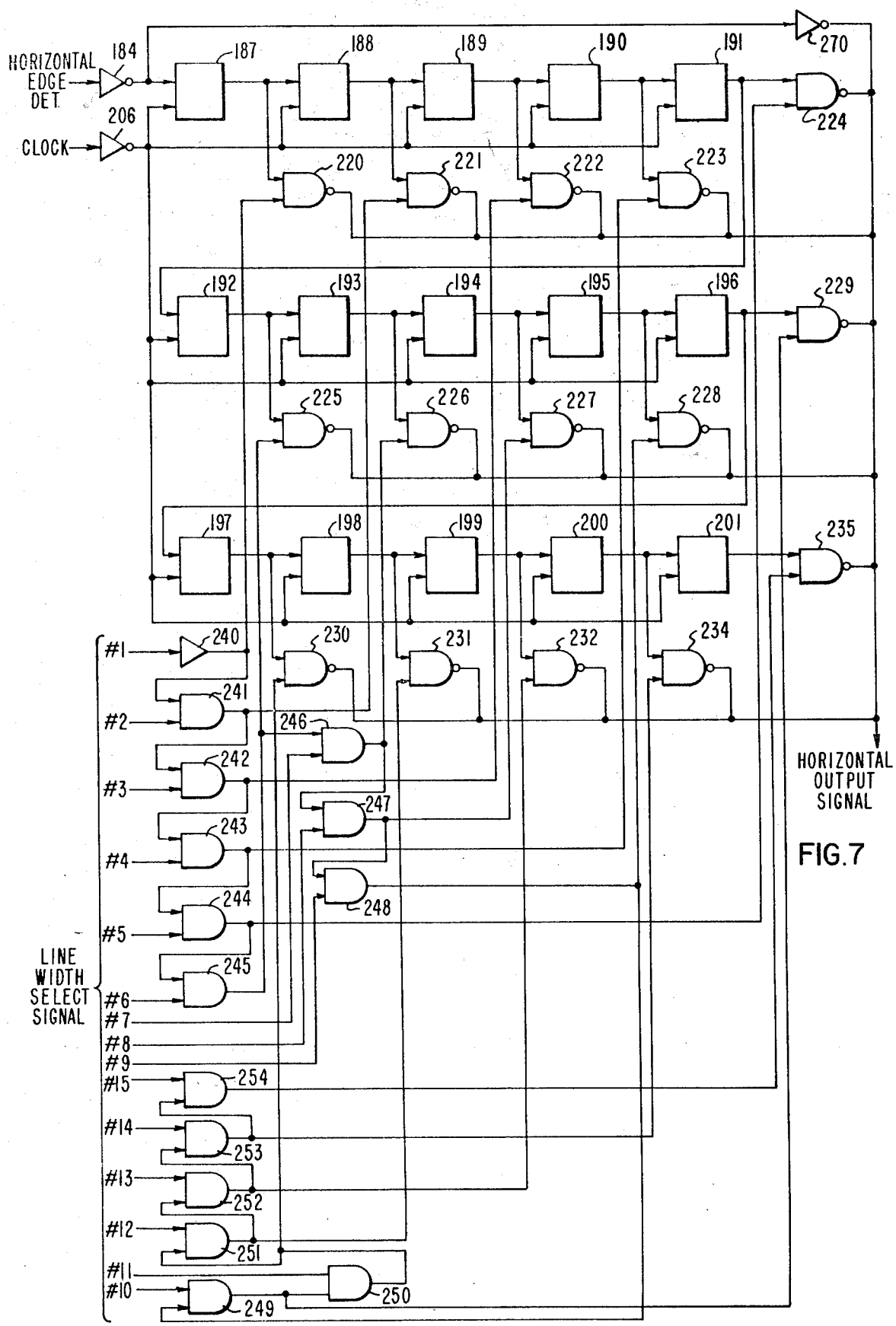
FIG. 7 is a block diagram of the memories used for generating a signal to cause the printer to produce line segments corresponding to changes in the gray scale in the direction parallel to the direction of scan.

The output signal from NAND gate 180 is coupled as an input signal to an inverter 184 (FIG. 7). Inverter 184 inverts this signal and provides an input signal to a 15-stage shift register with the stages of this register illustrated at reference numerals 187 through 201. Each stage of this shift register has 2,048 storage locations and is shifted by a clock signal coupled to the input of inverter 206. This causes each of the pulses from gate 180, (FIG. 6) indicating a change in gray scale and horizontal direction has been detected, to be repeated during subsequent scan lines at the output of a stage of this shift register with the maximum number of lines the signal is repeated being equal to fifteen. The output signals from each of these shift registers is combined in a gating circuit to generate a signal indicating the width of the line segment to be printed when a change in the gray scale of the image being scanned in a direction parallel to the scan direction is detected. The detailed operation of this gating circuit is described below.

The output signals of the shift registers 187 through 201 are respectively coupled to the first input terminal of fifteen NAND gates 220 through 235. Bits one through fifteen of a fifteen-bit line width select signal are respectively coupled to the input of an amplifier 240 and the first input or fourteen AND gates 241 through 254. The output signal of an inverter 240 and the fourteen AND gates 241 through 254 are respectively coupled to the second input terminals of the fifteen AND gates 220 through 234. The output signal of the inverter 240 is coupled to the second input terminal of an AND gate 241. Output signals from AND gates 241 through 253 are respectively coupled as input signals to AND gates 242 through 254. An inverter 270 inverts the input signal to the first shift register 187. NAND gates 220 through 235 and inverter 270 are connected in a wired "OR" arrangement to generate at the output terminal of these gates a signal defining line segments to be printed by the printer 44. This segment will be repeated for one line if the bit of the line width signal coupled to the inverter 240 is a logic "one" and all other bits of this signal are logic "zero". The printed segment will be repeated for two scan lines if the bits of the line width selector signal coupled to the input of amplifier 240 and AND gate 241 are logic "one" with all other bits logic "zero". Similarly, each line segment can be repeated for up to fifteen lines by selecting the logic level of the bits of the line width select signal.

The horizontal and vertical output signals are coupled to the two inputs of a NAND gate 271 (FIG. 8) to generate at the output of this gate to a logic "zero" signal when a change in the gray scale of the scanned image in either a horizontal or vertical direction has been detected. This signal is inverted by an qnverter 272. The output signal of this inverter 272 and a "normal signal" are coupled as inputs to a NAND gate 273. A "reverse signal" and the output signal of a NAND gate 271 are coupled to the input terminals of a second NAND gate 274. Output signals from the two NAND gates 273 and 274 and a blanking signal from the scanner 20 (FIG. 1) are combined in a three-input NAND gate 275. The output signal of this gate is inverted by an inverter 276 to generate a video signal to operate the printer 44. The printed image will be either "normal" or "reversed" depending on the status of the normal and reverse signals; "normal" being defined as a black line on a white background for change in the gray scale of the image being scanned. "Reverse" is a white line on a black background.

It will be recognized by those skilled in the art that the techniques described above can be used to analyze changes in amplitude of any time dependent signal. The video signal produced by scanning an image to detect changes in the gray scale of the scanned image is one example of such a time dependent signal.

I claim:

1. A system for scanning an image to detect changes in the gray scale of the image being scanned, comprising:
   (a) a scanner for scanning said image to produce a plurality of lines of video information, said plurality of lines of video information comprising a video signal representing said image being scanned;
   (b) delay means for delaying said video signal by a predetermined amount to produce a first delayed video signal;
   (c) means for comparing the amplitude of said video signal to the amplitude of said first delayed video signal and for generating a plurality of pulses with a pulse being generated each time the absolute value of the difference between these signals exceeds a predetermined value;
   (d) storage means for storing a predetermined number of said pulses;
   (e) circuit means for examining the pattern of said stored pulses to generate a signal indicative of the central portion of the change in gray scale represented by said stored pulses.

2. A system for scanning an image to detect changes in the gray scale of the image being scanned in accordance with claim 1 wherein said delay means includes means for digitizing said video signal to produce digital numbers and digital storage means for storing a predetermined number of digital numbers, each of said digital numbers being representative of the amplitude of said video signal at a predetermined sample time; and read means for selectively recovering said digital numbers to produce said first delayed video signal.

3. A system for scanning an image to detect changes in the gray scale of the image being scanned in accordance with claim 2 wherein said means for comparing said video signal to said first delayed video signal comprises an adder for adding said digital numbers representing said video signal to the complement of said digital numbers representing said first delayed video signal and a logic circuit for combining the output signal of said adder to produce a digital number equal to the absolute value of the difference between the digital numbers representing said video signal and the said digital numbers representing said first delayed video signal.

4. A system for scanning an image to detect changes in the gray scale of the image being scanned in accordance with claim 3 wherein said storage means for storing a predetermined number of said pulses is a shift register.

5. A system in accordance with claim 4 further including means for selectively recovering said stored digital numbers to generate said first and second delayed video signals and means for comparing said first and second delayed video signals to said video signal to independently detect changes in said gray scale in a direction parallel to scanning and in a direction perpendicular to the direction of scanning.

6. A system in accordance with claim 5 further including means for producing a first line segment of predetermined length for each detected change in the gray scale in a direction perpendicular to scanning, said line segment comprising a portion of a line drawing.

7. A system in accordance with claim 6 further including means for producing a second line segment of a predetermined length for each detected change in the gray scale in a direction parallel to the direction of scanning, said first line segment comprising a portion of a line drawing.

8. A system in accordance with claim 7 wherein said first and said second line segments comprise a line drawing with the line of this drawing corresponding to the detected changes in the gray scale by said image.

* * * * *